(12) United States Patent
Obara

(10) Patent No.: US 6,246,137 B1
(45) Date of Patent: Jun. 12, 2001

(54) SPINDLE MOTOR

(75) Inventor: Rikuro Obara, Miyota-machi (JP)

(73) Assignee: Minebea Kabushiki Kaisha (Minebea Co., Ltd.), Nagano-ken (JP)

( * ) Notice: Subject to any disclaimer, the term of this patent is extended or adjusted under 35 U.S.C. 154(b) by 0 days.

(21) Appl. No.: 09/356,410

(22) Filed: Jul. 16, 1999

(30) Foreign Application Priority Data

Jul. 17, 1998 (JP) .................................................. 10-203870

(51) Int. Cl.$^7$ ....................................................... H02K 5/16
(52) U.S. Cl. ..................... 310/90; 360/99.07; 360/99.08; 384/609; 384/615
(58) Field of Search ................................. 310/90; 384/613, 384/517, 609, 536, 220, 236, 615; 360/99.07, 99.08

(56) References Cited

U.S. PATENT DOCUMENTS

| | | | |
|---|---|---|---|
| 5,820,273 | * 6/1999 | Obara | 384/613 |
| 5,850,318 | * 12/1998 | Dunfield et al. | 360/99.08 |
| 5,914,837 | * 6/1999 | Edwards et al. | 360/106 |
| 5,999,373 | * 12/1999 | Allsup et al. | 360/106 |

* cited by examiner

*Primary Examiner*—Nestor Ramirez
*Assistant Examiner*—Thanh Lam
(74) *Attorney, Agent, or Firm*—Israel Gopstein

(57) ABSTRACT

The object of the present invention is to provide a spindle motor of high accuracy of rotation irrespective of the temperature differential for driving the hard disk or disks of the hard disk drive device.

A spindle motor including a shaft secured on a base to extend vertically therefrom, and a rotor hub journalled rotatably around the shaft through a plurality of anti-friction bearings each of which has outer and inner races and rotational bodies disposed between races, characterized in that a cylindrical sleeve having a through bore is disposed between outer peripheral surface of each anti-friction bearing and an inner peripheral surface of a central bore provided through the rotor hub, the sleeve and the outer races of the anti-friction bearings are made of the ferrous metal material of substantially the same coefficient of expansion, and the inner races of anti-friction bearings and the shaft are also made of the ferrous metal material of substantially the same coefficient of expansion.

12 Claims, 2 Drawing Sheets

PRIOR ART

SPINDLE MOTOR

BACKGROUND OF THE INVENTION

1. Technical Field

The present invention relates to a spindle motor, more particularly the spindle motor suitable for driving a hard disk or disks of the hard disk drive device.

2. Description of the Prior Art

In the case of the prior art as shown in FIG. 3, the hard disk drive motor of the hard disk drive device is provided with a shaft 22 secured on a base 21 to extend vertically therefrom, and a rotor hub 25 journalled rotatably around the shaft through a pair of upper and lower bearings 23, 24. The outer peripheral surface of the bearings 23, 24 are mounted within the vertical through bore 25a of the rotor hub. In FIG. 3, the reference numeral 26 is attached to a spacer to be disposed between the bearings, the reference numeral 27 is attached to a seal ring, the reference numeral 28 is attached to rotor magnets, the reference numeral 29 is attached to stators, and the reference numeral 30 is attached to stator coils. The spacer and the seal ring are adapted to be secured on the inner peripheral surface of the through bore of the rotor hub.

The temperature of the spindle motor will vary under the effect of the heat produced during the operation of the motor itself, or the changing of the atmospheric temperature, however, temperature variation of upper and lower ball bearing is different. This will sometimes lead the temperature difference between the upper and lower ball bearings 23, 24. This temperature difference between bearings will also vary the size of the bearings, i.e. the bearing of higher temperature will expand beyond the size of the lower one. This variation of the size of the bearings will cause the stress to be applied to the rotor hub to deform it to reduce the accuracy of the rotation of the rotor hub.

The outer races of the ball bearings are generally made of the ferrous metal material and the rotor hub 25 of the interior surface 25a of which the outer races are adapted to be interference fitted or adhesively secured is generally made of aluminum material larger in its coefficient of expansion than that of the ferrous metal material.

When the temperature of the spindle motor is decreased from the temperature during the assembling operation of the ball bearings into the rotor hub, the outer races of the ball bearings are apt to deformed under the squeezing effect due to the thermal retraction of the rotor hub. This will cause the reduction of the accuracy of the rotation of the rotor hub or noise produced during the rotation of the rotor hub.

Further, the rotor hub of aluminum material has a tendency to be damaged or deformed by the outer races of the ferrous metal material while the ball bearings are to be incorporated into the rotor hub. This is because the aluminum material of the rotor hub is lower in its hardness than that of the outer races of the bearings. This will impair the accuracy of the assembly so that the accuracy of the rotation of the rotor hub is also decreased.

In the spindle motor of the hard disk drive device, the lowered accuracy of rotation of the rotor hub will lean the hard disk or magnetic storage medium, or drive the disk in an eccentric manner to occur the disk crush to impair the reliability of the hard disk drive device.

Accordingly, the object of the present invention is to provide a spindle motor of high accuracy of rotation irrespective of the temperature differential for driving the hard disk or disks of the hard disk drive device.

SUMMARY OF THE INVENTION

These and other objects are achieved by a spindle motor including a shaft secured on a base to extend vertically therefrom, and a rotor hub journalled rotatably around the shaft through a plurality of anti-friction bearings each of which has outer and inner races and rotational bodies disposed between races, characterized in that a cylindrical sleeve having a through bore is disposed between outer peripheral surface of each anti-friction bearing and an inner peripheral surface of a central bore provided through the rotor hub, the sleeve and the outer races of the anti-friction bearings are made of the ferrous metal material of substantially the same coefficient of expansion, and the inner races of anti-friction bearings and the shaft are also made of the ferrous metal material of substantially the same coefficient of expansion.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

Figure 1:
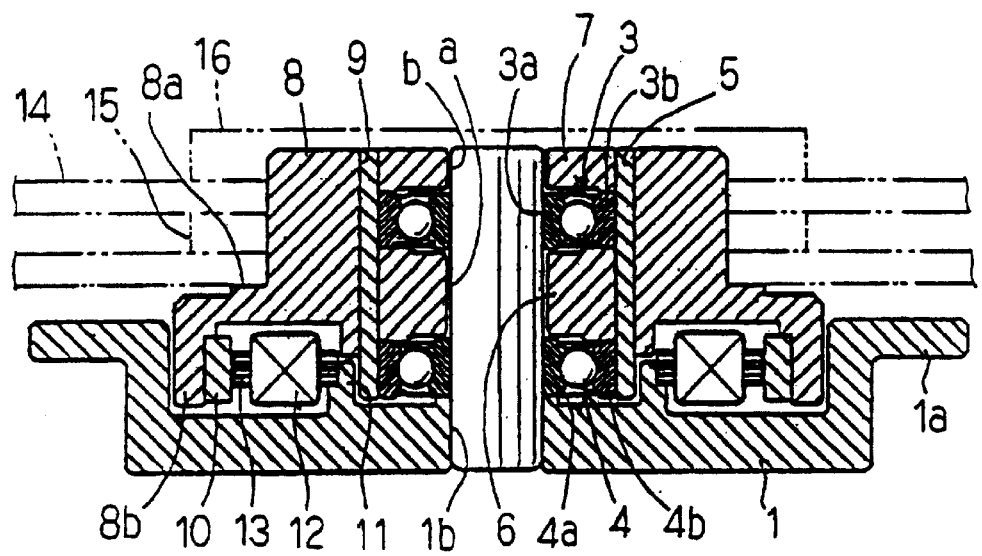
FIG. 1 is a longitudinal cross sectional view showing the spindle motor of the present invention.

The spindle motor in accordance with the present invention will now be described with reference to the attached drawings.

The spindle motor of the present invention includes an annular base 1 through the central portion of which a bore 1b is provided for securing a shaft 2 so as to extend vertically therefrom. Inner races 3a and 4a of the upper and lower anti-friction bearings or ball bearings 3 and 4 are mounted around the shaft 2. Outer races 3b and 4b of these upper and lower bearings 3 and 4 are fixed within a cylindrical sleeve 5.

In the spindle motor of the present invention, the sleeve 5 is formed of the same material as that employed for the outer races 3b and 4b of the ball bearings 3 and 4, i.e. the coefficient of expansion of these elements are equal. Also, the shaft is formed of the same material as that employed for the inner races 3a and 4a of the ball bearings 3 and 4, i.e. the coefficient of expansion of these elements are equal. The material to be used is the ferrochromium or stainless bearing steel.

The upper and lower ball bearings 3 and 4 are adapted to be spaced a predetermined distance by interposing a spacer 6 therebetween. The inner diameter of the spacer is slightly larger than the outer diameter of the shaft 2 so that a slight clearance (a) is formed between the outer peripheral surface of the shaft 2 and the inner peripheral surface of the spacer. This structure will confine the immigration of the lubricant between the upper and lower ball bearings.

An annular labyrinth sealing element 7 is secured above the upper ball bearing 3 for inhibiting the leakage of the lubricant from the upper surface of the ball bearing 3. The inner diameter of the sealing element is slightly larger than the outer diameter of the shaft so that a clearance (b) in the order of few microns is formed therebetween.

The sleeve 5 is adapted to be fitted within the vertical through bore 9 formed centrally through the rotor hub 8, i.e. a rotational member of the spindle motor.

The outer peripheral portion of the rotor hub 8 is provided with a hard disk mounting portion 8a for the disk or disks of the hard disk drive device. A flange 8b downwardly depending from the hard disk mounting portion is provided on the interior surface thereof with rotor magnets 10 made of permanent magnets.

Stators 13 having a coil 12 wounded respectively therearound are secured around the boss 11 extending vertically upwardly from the upper surface of the base with leaving a slight clearance between the outer peripheral portion the stators and the inner peripheral surface of the rotor magnets 10. In this connection, the rotor hub 8 is adapted to be rotatably drove by energizing the coils 12.

The assembling procedure of the spindle motor of the present invention will be effected as mentioned below.

The lower ball bearing 4, the spacer 6, the upper ball bearing 3, and the labyrinth seal ring 7 are interference fitted or adhesively secured in the designated order around the shaft 2 to provide a shaft-bearing assembly, the shaft-bearing assembly is interference fitted or adhesively secured within the sleeve 5 to provide a shaft bearing-sleeve assembly, the shaft-bearing-sleeve assembly is interference fitted or adhesively secured within the through bore 9 of the rotor hub, and then the lower end of the shaft 3 is interference fitted or adhesively secured within the bore 1b of the base.

Figure 2:
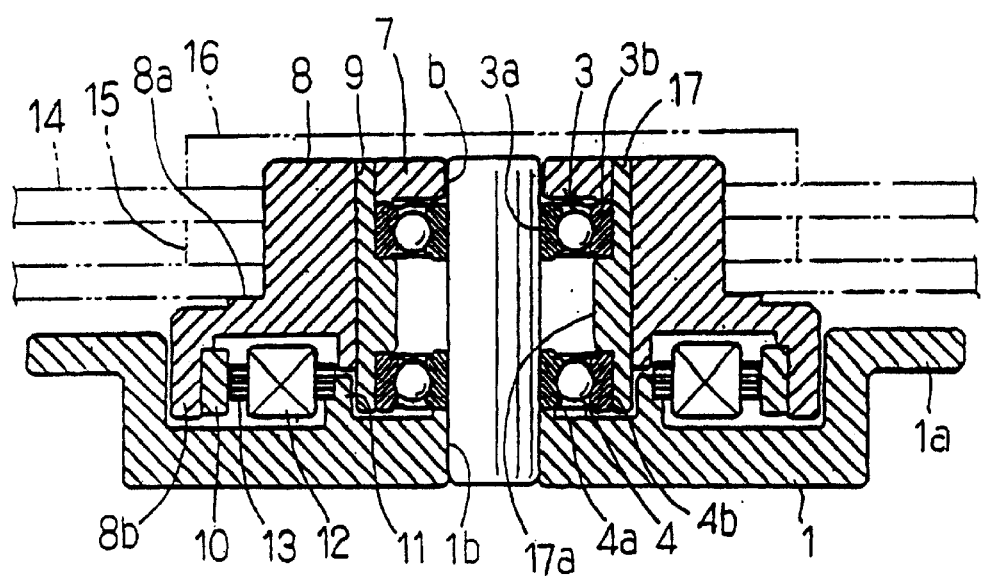
FIG. 2 is a longitudinal cross sectional view showing another embodiment of the spindle motor of the present invention.
Figure 3:
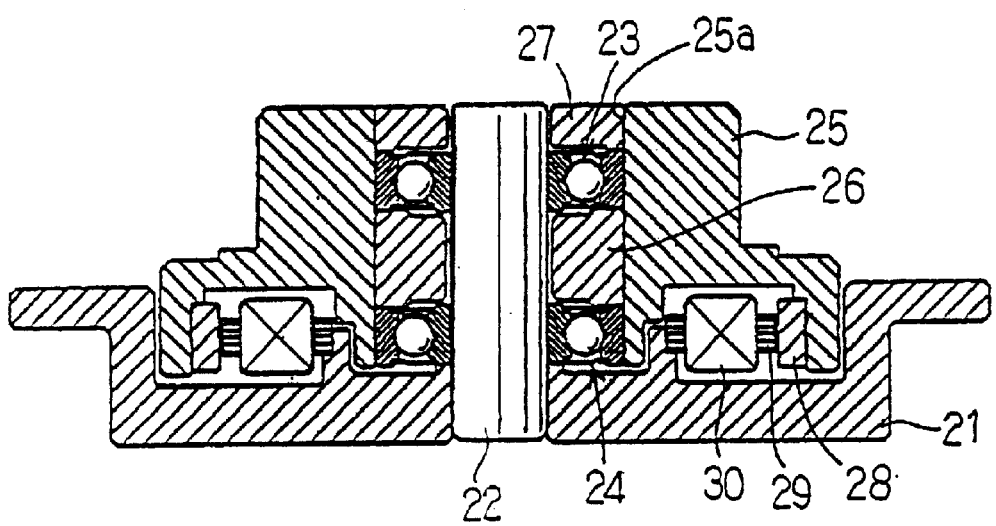
FIG. 3 is a longitudinal cross sectional view showing the spindle motor of the prior art.

In that case that the spindle motor of the present invention is intended to be used for driving the hard disk or disks, a plurality of hard disks 14, 14 (in the case shown in FIG. 2, two hard disks are used) spaced by interposing a spacer 15 therebetween are mounted on the hard disk mounting portion 8a of the rotor hub 8, and the disks are secured thereto by means of disk retaining plate 16. The hard disk is a magnetic storage medium for the hard disk drive device.

Although in the embodiment as described above the sleeve 5 is made of the same material as that of the outer races 3b, 4b of the ball bearing 3, 4, different materials can also be used if the materials are substantially equal in their coefficient of expansion.

Further, the inner races 3a, 4a of the ball bearing 3, 4 and the shaft can also be made by using the different materials if these materials are substantially the same in their coefficient of expansion.

Roller bearing or other anti-friction bearings can also be used instead of ball bearings.

Although in the embodiment as mentioned above, the sleeve 5 of straight cylindrical configuration is used, the sleeve need not be a straight configuration if it is formed as a integrally formed element. For example, as can be seen from FIG. 2, a sleeve 17 including a reduced inner diameter stepped portion 17a on the central portion thereof can also be used. In this case, the outer races 3b, 4b are abutted on each end face of the reduced inner diameter stepped portion 17a respectively, so that there is no need to provided a spacer between the bearings.

The advantages or effects to be obtained from the present invention

In accordance with the present invention, the spindle motor includes a cylindrical sleeve disposed between the outer races of a plurality of anti-friction bearings and central through bore of the rotor hub, and the sleeve is made of the same ferrous metal material as that of the outer races, the rate of the expansion and/or the retraction of the sleeve and the outer races of the anti-friction bearings are substantially the same with each other. In this connection, the stress produced under the effect of the temperature differential by the variation of the size of the outer races of the anti-friction bearings and the size of the outer diameter of the sleeve will be distributed over the entire surface of the contact surface defined between the sleeve and the rotor hub, so that the there are substantially no possibility of deforming the rotor hub under the effect of the temperature differential.

Further, upon shrinkage of the rotor hub under the effect of the temperature differential, the stress produced thereby will act on the sleeve and not directly on the outer races of the anti-friction bearings, so that the deformation of the outer races can be avoided.

Additionally, there are substantially no possibility of damaging the shaft-bearing assembly and the sleeve when such assembly is intended to be interference fitted or adhesively secured within the sleeve. This is because both of the outer races of the assembly and the sleeve are formed by the ferrous metal material of high hardness. Further, since the assembling operation can be made only by interference fitting or adhesively securing the shaft-bearing-sleeve assembly into the through bore of the rotor hub, the assembling operation can be made easier than that had been effected in the prior art in which the ball bearings of the reduced longitudinal size should be interference fitted or adhesively secured directly within the rotor hub. Moreover, the assembling operation can be made in high precision.

In conclusion, the temperature change of the spindle motor of the present invention will not affect the accuracy of the rotation of the rotor hub, so that high accuracy of the rotation of the magnetic disk or disks can be obtained while the spindle motor of the present invention is employed on the hard disk drive device, and the hard disk drive device of high reliability can also be obtained.

While particular embodiments of the present invention have been illustrated and described, it should be obvious to those skilled in the art that various changes and modifications can be made without departing from the spirit and scope of the invention.

What is claimed is:

1. A spindle motor including a shaft secured on a base to extend vertically therefrom, and a rotor hub journalled rotatably around the shaft through a plurality of anti-friction bearings each of which has outer and inner races and rotational bodies disposed between races, characterized in that a cylindrical sleeve having a through bore is disposed between outer peripheral surface of each anti-friction bearing and an inner peripheral surface of a central bore provided through the rotor hub, and the sleeve and the outer races of the anti-friction bearings are made of the ferrous metal material of substantially the same coefficient of expansion.

2. A spindle motor of claim 1 wherein the ferrous metal material is the ferrochromium bearing steel.

3. A spindle motor of claim 1 wherein the ferrous metal material is the stainless bearing steel.

4. A spindle motor of claim 1 wherein said sleeve and the outer races of the anti-friction bearing are made of the ferrous metal material of the same coefficient of expansion.

5. A spindle motor of claim 4 wherein the ferrous metal material is the ferrochromium bearing steel.

6. A spindle motor of claim 4 wherein the ferrous metal material is the stainless bearing steel.

7. A spindle motor including a shaft secured on a base to extend vertically therefrom, and a rotor hub journalled rotatably around the shaft through a plurality of anti-friction bearings each of which has outer and inner races and rotational bodies disposed between races, characterized in that a cylindrical sleeve having a through bore is disposed between outer peripheral surface of each anti-friction bearing and an inner peripheral surface of a central bore provided through the rotor hub, the sleeve and the outer races of the anti-friction bearings are made of the ferrous metal material of substantially the same coefficient of expansion, and the inner races of anti-friction bearings and the shaft are also made of the ferrous metal material of substantially the same coefficient of expansion.

8. A spindle motor of claim 7 wherein the ferrous metal material is the ferrochromium bearing steel.

9. A spindle motor of claim 7 wherein the ferrous metal material is the stainless bearing steel.

10. A spindle motor of claim 7 wherein said sleeve, inner and outer races of each anti-friction bearing, and the shaft are made of the ferrous metal material of substantially the same coefficient of expansion.

11. A spindle motor of claim 10 wherein the ferrous metal material is the ferrochromium bearing steel.

12. A spindle motor of claim 10 wherein the ferrous metal material is the stainless bearing steel.

* * * * *